United States Patent
Anvari

(10) Patent No.: US 10,021,592 B1
(45) Date of Patent: Jul. 10, 2018

(54) REDUCED LTE BASEBAND RATE IN CLOUD RAN

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 121 days.

(21) Appl. No.: 15/163,119

(22) Filed: May 24, 2016

Related U.S. Application Data

(60) Provisional application No. 62/170,665, filed on Jun. 3, 2015.

(51) Int. Cl.
| G06F 11/00 | (2006.01) |
| H04W 28/02 | (2009.01) |
| H04B 1/66 | (2006.01) |
| H04B 7/0413 | (2017.01) |
| H04L 12/825 | (2013.01) |

(52) U.S. Cl.
CPC .......... H04W 28/0289 (2013.01); H04B 1/66 (2013.01); H04B 7/0413 (2013.01); H04L 47/25 (2013.01)

(58) Field of Classification Search
CPC ................................................ H04W 28/0289
USPC ......................................................... 370/230
See application file for complete search history.

(56) References Cited

U.S. PATENT DOCUMENTS

| 9,699,583 | B1* | 7/2017 | Lyren | H04S 7/303 |
| 9,756,142 | B2* | 9/2017 | Dey | H04L 67/2842 |
| 2011/0235799 | A1* | 9/2011 | Sovio | H04L 9/083 |
| | | | | 380/30 |
| 2011/0238985 | A1* | 9/2011 | Sovio | H04N 21/2347 |
| | | | | 713/168 |
| 2012/0230385 | A1* | 9/2012 | Currivan | H04L 25/022 |
| | | | | 375/233 |
| 2014/0280679 | A1* | 9/2014 | Dey | H04L 67/2842 |
| | | | | 709/213 |
| 2014/0344736 | A1* | 11/2014 | Ryman | G06F 3/04883 |
| | | | | 715/767 |
| 2015/0372728 | A1* | 12/2015 | Rahman | H04B 7/0456 |
| | | | | 370/329 |

* cited by examiner

*Primary Examiner* — Shripal Khajuria

(57) ABSTRACT

A rate lowering technique for the baseband sample signals to lower the transmission rate between remote radio units and the cloud in cloud RAN architecture. The connection between cloud and remote radios is Ethernet and truncation and decimation is used to lower the transmission rate between these two components in LTE networks.

6 Claims, 5 Drawing Sheets

REDUCED LTE BASEBAND RATE IN CLOUD RAN

The application claims priority to the following related application and included here is as a reference.

Provisional application: U.S. patent application No. 62/170,665 filed Jun. 3, 2015, and entitled "REDUCED LTE BASEBAND RATE IN CLOUD RAN".

This application is continuation of patent application Ser. No. 15/145,536

BACKGROUND

Mobile data is increasing at a compound annual rate of far more than 100% as a result of an increasing level of penetration of data-intensive devices and an increasing level of usage per device. These devices are getting smarter due to improved user interfaces, vastly increased numbers of applications, faster processors, and improved radio access technologies, therefore are consuming increasing amounts of data.

Data volumes are growing at a rate that exceeds operators' ability to grow capacity. Capacity growth typically comes from growth in the number of sites, from increased spectrum resources, and from enhancements in radio access technology.

Long Term Evolution (LTE) technology, standardized by the Third Generation Partnership Project (3GPP), has emerged as the next generation wireless technology that will lead the growth of mobile broadband services in the next decade. Its adoption by service providers around the world has the potential to generate economies of scale unprecedented by any previous generation of wireless networking technology as it becomes the universal 4G/5G mobile platform used by all service providers.

LTE is critical to delivering the lower cost per bit, higher bandwidth, and subscriber experience needed to address the challenges of mobile broadband. It has the potential to transform how subscribers and machines use applications and content distributed over mobile and converged networks. The effect will be to increase the value of these networks and create favorable conditions for the continued mass market adoption of mobile broadband services.

The reality is that, we have reached a point where an increase in number of conventional sites and available spectrum can no longer keep up with the explosion in demand for mobile data capacity—actually falling short by an entire order of magnitude in recent years. What other options exist? One possibility is architectural innovation. What if the definition of a "cell site" were radically changed, in such a way that the number of "sites" dramatically increased and the cost per unit of capacity (after adjusting for the inevitable lower utilization of smaller sites) significantly decreased?

This capacity gap drives deployment of at least one order-of-magnitude more "small cells"—making up for the difference by means of spectrum re-use. In order to provide consistent capacity density across a mobile service area, these deployments need to take place in a more "distributed" manner—forcing operators to expand beyond the current foot-print for the deployment of more mobile broadband radios. In many cases, operators need to acquire more and new types of cell locations to deploy data-centric wireless broadband service networks. These cell locations then determine the required type of "small cell" equipment to build a heterogeneous mobile radio access network.

In next decade, Web-scale IT will be an architectural approach found operating in most of global enterprises, up from less than 10 percent in 2013. Web-scale IT is a pattern of global-class computing that delivers the capabilities of large cloud service providers within an enterprise IT setting by rethinking positions across several dimensions.

Large cloud services providers such as Amazon, Google, Facebook, etc., are reinventing the way in which IT services can be delivered. Their capabilities go beyond scale in terms of sheer size to also include scale as it pertains to speed and agility. If enterprises want to keep pace, then they need to emulate the architectures, processes and practices of these exemplary cloud providers.

Web-scale IT looks to change the IT value chain in a systemic fashion. Data centers are designed with an industrial engineering perspective that looks for every opportunity to reduce cost and waste. Web-oriented architectures allow developers to build very flexible and resilient systems that recover from failure more quickly.

Web-scale IT refers to a global-class of computing or architectural approach used to deliver the capabilities of large cloud service providers within an enterprise IT setting. The approach is to design, build and manage data center infrastructure where capabilities go beyond scale in terms of size to include scale as it pertains to speed and agility. Web-scale IT is simply defined as all the things happening at large cloud service firms, such as Google, Amazon, Netflix, Facebook and others, that enables them to achieve extreme levels of agility and scalability by applying new processes and architectures Web-scale IT methodology pertains to designing, deploying and managing infrastructure at any scale and can be packaged in a number of ways to suit diverse requirements and can scale to any size of business or enterprise. It is not a single technology implementation, but rather a set of capabilities of an overall IT system One of the essential components of a web-scaled infrastructure is the backhaul between the remote radio head and the cloud RAN. Since the baseband signal processing is performed in the cloud the signal that the backhaul carry between cloud and remote radio unit is baseband samples and control signals. Therefore, the backhaul needs to support very high bandwidth with very low loss of packets, and acceptable latency.

This application discloses a method of lowering baseband rate by truncation and decimation of baseband samples.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
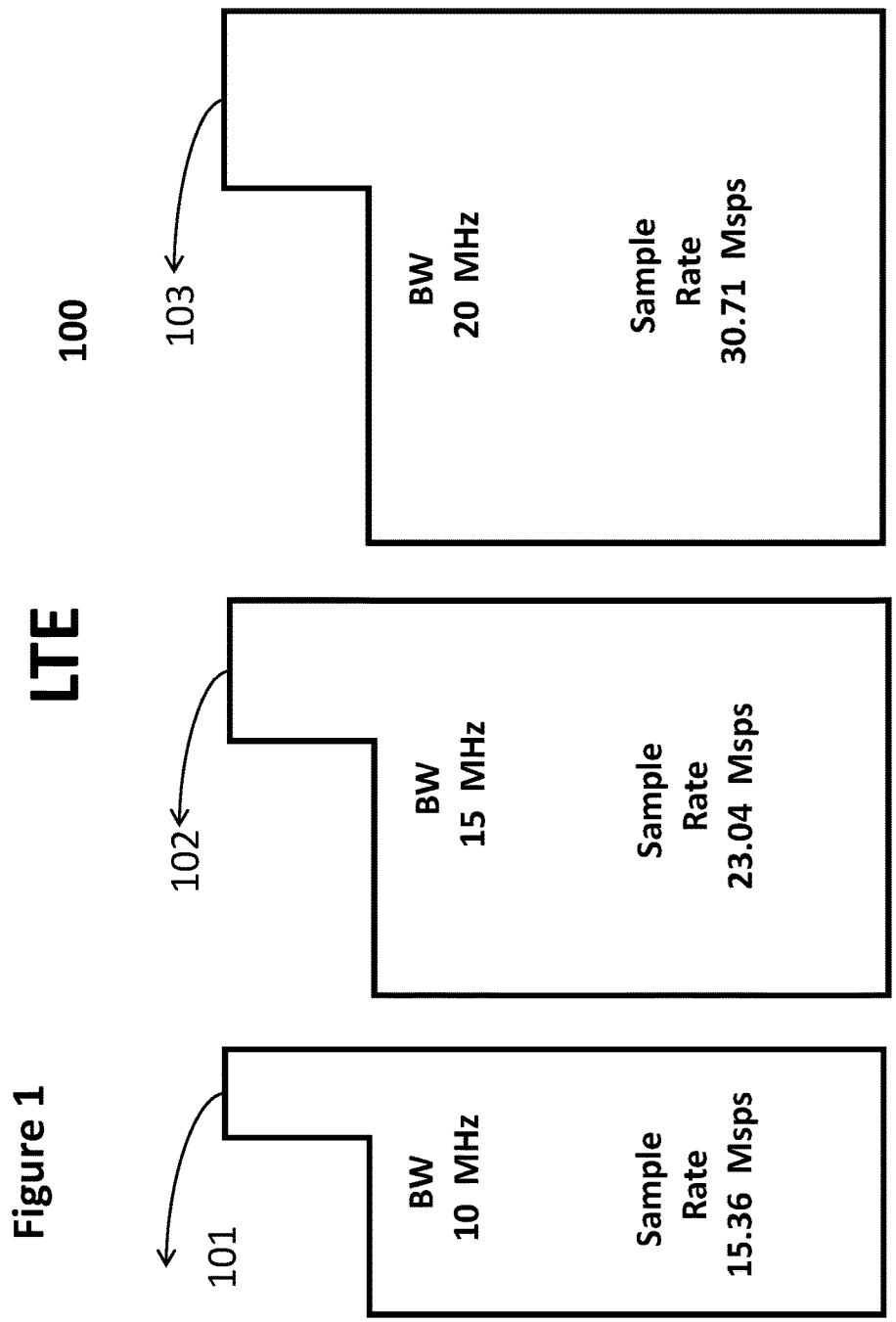
FIG. 1 illustrates an embodiment of LTE channel and sampling rate structure.

FIG. 1 depicts three LTE channel bandwidth and sample rate. The sample rates for 10 MHz, 15 MHz, and 20 MHz channel bandwidths are 15.36 msps, 23.04 msps, and 30.71 msps. LTE is an OFDM technology and the channel bandwidth is divided into sub-carriers with 15 KHz spacing. A resource block (RB) in LTE comprises of twelve sub-carriers. A subscriber can be assigned minimum of 6 RB and a maximum of entire LTE channel bandwidth. The total number of RBs in 10, 15, 20 MHz channel bandwidth are 50, 75 and 100 which results in occupied bandwidth (with 99% of energy) of 9 MHz, 13.5 MHz and 18 MHz. The baseband bandwidth for 10, 15, and 20 MHz is 4.5, 6.75 and 9 MHz. Therefore, the baseband sampling rate between the baseband unit pairs in the cloud and in the remote radio unit and the baseband unit pairs in remote radio unit and the cloud can be reduced without compromising performance.

Figure 2:
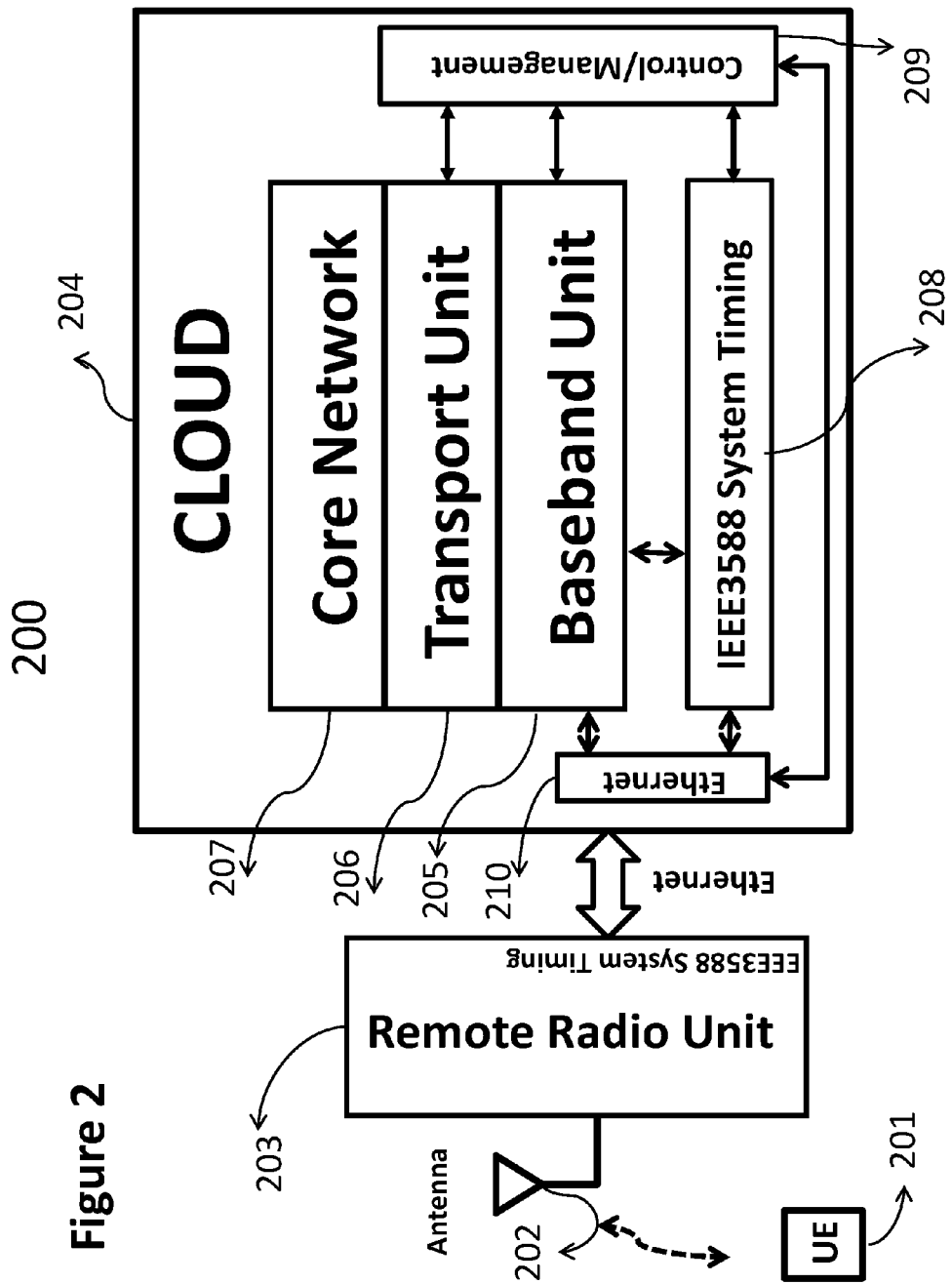
FIG. 2 illustrates embodiments of a packet based cloud Radio Access Network (RAN).

FIG. 2 illustrates an embodiment of cloud RAN 200. In general, cloud RAN 200 facilitates communication between user equipment (UE) 201 and core network 207. Signal sent by UE 201 is received by antenna 202 and translated to baseband signal by remote radio unit 203. The baseband signal from remote radio unit 203 with IEEE1588 timing is sent through asynchronous link to the cloud 204 that accommodates baseband unit 205, transport unit 206, core network 207, IEEE1588 system timing 208, control/management 209 and Ethernet port 210. The detected signal from baseband unit 205 is transported to core network 207 by transport unit 206.

The cloud RAN 200 uses IEEE1588 to synchronize the cloud 204 with remote radio unit 203. The Ethernet packets received by cloud 204 from remote radios (remote radio 203 being one of them) through asynchronous link have a remote radio identifier and are time stamped, have a sequence number or both.

The baseband unit 205 uses memory blocks to store the received baseband sample streams from remote radios (remote radio unite 203 being one of them) based on their identifier, time tag or sequence number to avoid any early and late Ethernet packets. The memory size of the baseband unit block 205 is far more than the maximum delay jitter of Ethernet packets received from the remote radios (remote radio 203 being one of them).

The baseband unit 205 uses the timing and control information obtained from IEEE1588 system timing block 208 and control/management block 209 to format various baseband sample streams for detection.

The baseband unit 205 uses the timing and control information obtained from IEEE1588 system timing block 208 and control/management block 209 to format, time stamp, number and tag various baseband sample streams for transmission to remote radios (remote radio 203 being one of them).

The Ethernet block 210 provides the physical layer for the cloud 204 Ethernet port. It identifies the IEEE1588 timing packets, control/management packets, and baseband sample packets and sends them to IEEE1588 system timing block 208, control/management block 209, and baseband unit 205.

The Ethernet block 210 receives the IEEE1588 timing packets, control/management packets, and baseband sample packets from IEEE1588 system timing block 208, control/management block 209, and baseband unit 205 and sends them to remote radios (remote radio 203 being one of them).

The IEEE1588 system timing block 208 receives the timing packets from Ethernet block 210 and retrieves synchronization and time of the day information. The IEEE1588 system timing block 208 through the Ethernet block 210 communicates and exchanges timing packets with another node in the network to obtain and maintain synchronization and time of the day. The IEEE1588 system timing block 208 uses the clock synchronization information to create clocks and reference frequencies for the cloud 204.

The IEEE1588 system timing block 208 shares time of the day information with control/management block 209 and baseband unit 205. The IEEE1588 system timing block 208 can use SYNCE or other synchronization techniques (assisted GPS, NTP, etc.) for synchronizing remote radios (remote radio 203 being one of them) and the cloud 204.

The control/management block 209 performs control and management of the baseband unit 205, IEEE1588 system timing 208, and transport unit 206. It also monitors the cloud 204 for any alarm or mal-function and report the collected information to higher layers.

The control/management block 209 based on the control data received from remote radios (remote radio 203 being one of them) provides control for baseband sample streams detection in baseband unit 205. The control/management block 209 works as part of cloud RAN Self Organizing Network (SON) and carry out tasks required by SON.

Figure 3:
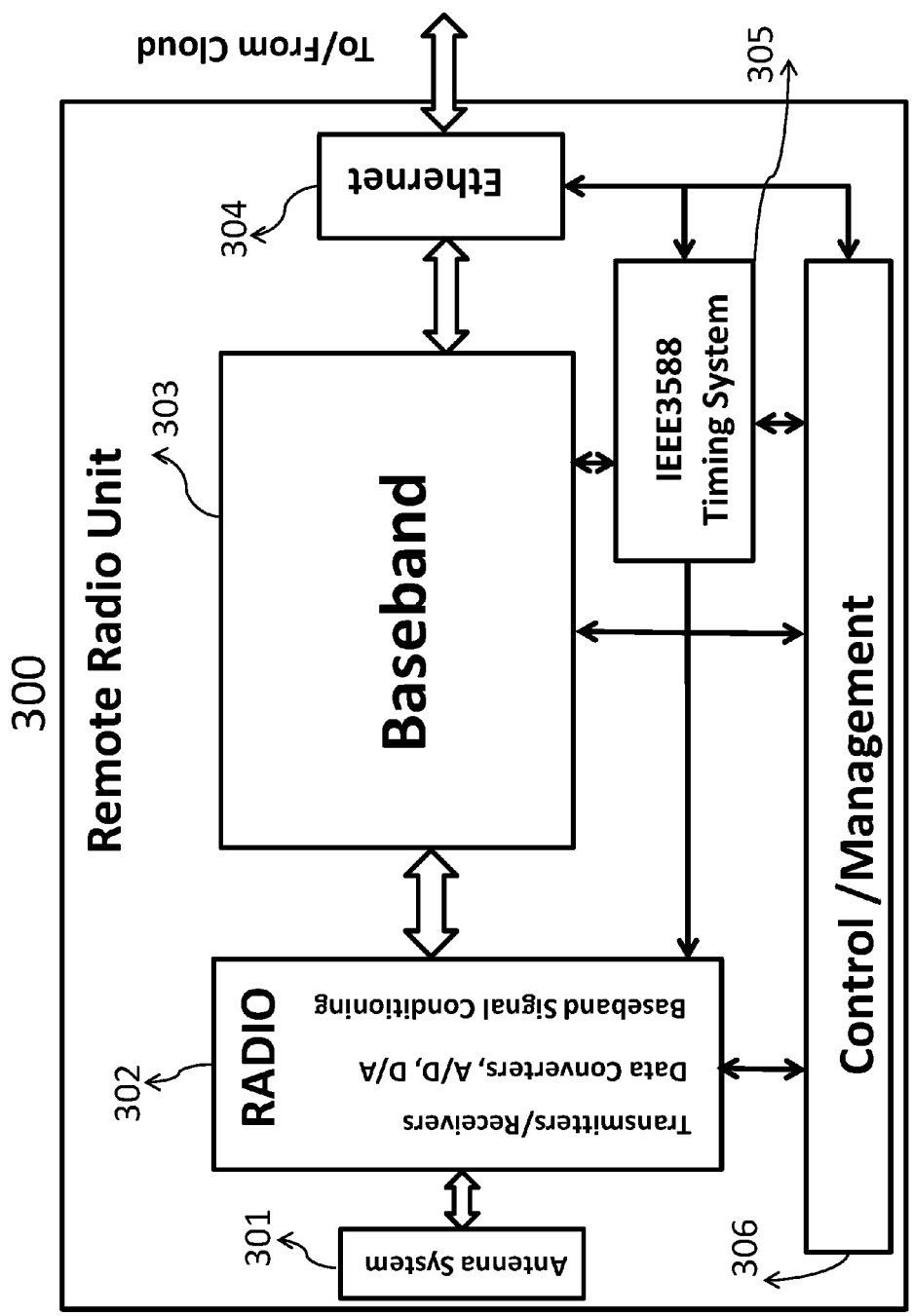
FIG. 3 depicts embodiments of a remote radio unit.

FIG. 3 illustrates the architecture of remote radio unit 300 within a cloud RAN. Remote radio unit 300 facilitates translation of analog wave signals received from antenna system 301 to digital baseband signals for transmission to the cloud using an asynchronous link between remote radio unit and the cloud. It also translates the digital baseband signals received from cloud through asynchronous link to analog wave signals to be transmitted by antenna system 301.

Remote radio unit 300 includes, among other things, antenna system 301, transmitters, receivers, data converters, and baseband signal conditioning (radio) block 302, baseband 303, Ethernet port 304, IEE1588 timing system 305, and control/management 306.

The antenna system 301 comprises multiple antennas to support diversity, MIMO and multi-point operation. It could also provide filtering, power amplification and low noise amplification.

The radio 302 performs the task of down conversion of radio frequency signals received from antenna system 301 to baseband or low IF signals and up conversion of the baseband and IF signals to radio frequency signals to be transmitted by antenna system 301. The radio 302 does the task of analog to digital and digital to analog conversion. The baseband sample streams from/to data converter are conditioned in baseband signal conditioning. The baseband signal conditioning can perform AGC, crest factor reduction (CFR), digital pre-distortion (DPD), equalization, beam forming and other baseband signal conditioning.

The baseband sample signals received from cloud through asynchronous link for transmission by radio 302 and received from radio 302 for transmission to the cloud are processed in baseband 303.

The Ethernet block 304 provides the physical layer for the remote radio unit 300 Ethernet port.

The Ethernet block 304 identifies the IEEE1588 timing packets, control/management packets, and the baseband sample packets received from cloud and sends them to IEEE1588 timing system block 305, control/management block 306, and baseband block 303.

The Ethernet block 304 receives the IEEE1588 timing packets, control/management packets, and the baseband sample packets from IEEE1588 timing system block 305, control/management block 303, and baseband block 303 and sends them to the cloud.

The IEEE1588 timing system block 305 receives the timing packets from Ethernet block 304 and retrieves synchronization and time of the day information.

The IEEE1588 timing system 305 through the Ethernet block 304 communicates and exchanges timing packets with another node in the transport network to obtain and maintain synchronization and time of the day. The IEEE1588 timing system block 305 uses the clock synchronization information to create clocks and reference frequencies for the entire remote radio unit 300. The IEEE1588 timing system block 304 shares time of the day information with control/management block 306 and baseband block 303.

The control/management block 306 performs control and management of the remote radio unit 300. It helps to initialize all the blocks in remote radio unit 300 at power up or reset. The control/management block 306 based on control data received from cloud facilitates baseband sample stream formatting in baseband block 303.

Figure 4:
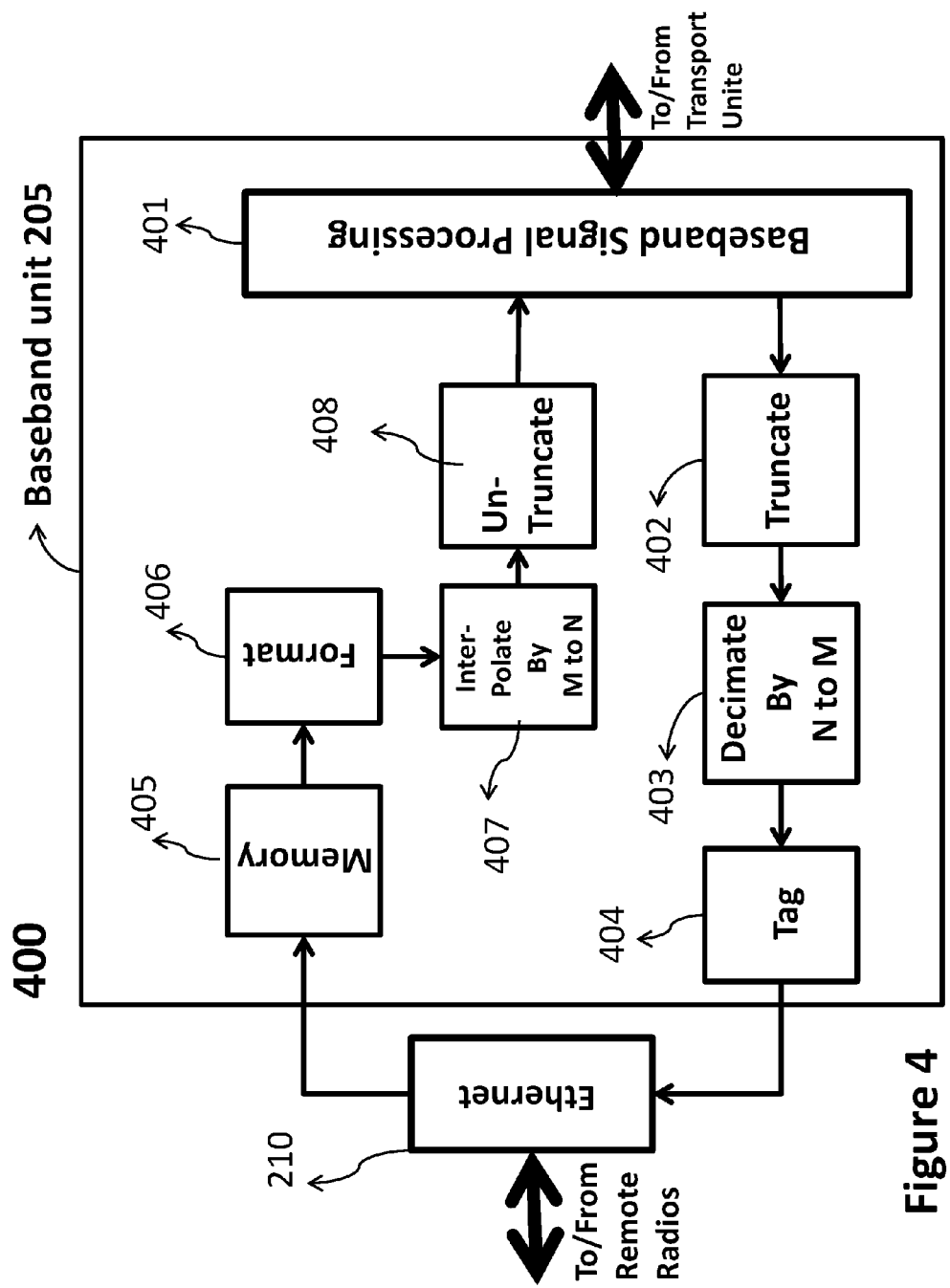
FIG. 4 shows an embodiment of Cloud baseband unit.

FIG. 4 depicts the embodiment of cloud sample rate reduction 400. The sample rate reduction 400 shows the details of baseband unit 205 within cloud RAN 200. The baseband unite 205 includes, among other things, signal processing 401, truncate block 402, decimate block 403, tag block 404, memory block 405, format block 406, interpolate block 407 and un-truncate block 408.

In one embodiment, the baseband unite block 205 perform signal processing using samples with at least 12 or 16 bits resolution in baseband signal processing block 401.

In one embodiment, the baseband unit block 205 truncates the baseband sample streams from baseband signal processing block 401 destined for transmission to remote radio unites in truncate block 402. In wireless communication truncation to 10 bits per sample produces negligible performance degradation. Lower baseband sample's bit resolution can also be used.

In one embodiment, the baseband unit block 205 decimates the baseband sample streams from baseband signal processing block 401 destined for transmission to remote radio unites in decimate block 403. In LTE wireless communication decimating the sample rate by M/N when M is 2 and N is 3 results in no performance degradation.

In one embodiment, the baseband unit block 205 tags the baseband sample streams from baseband signal processing block 401 destined for transmission to remote radio unites in tag block 404 with time, stream number, remote radio identifier and other information or identifiers.

In one embodiment, the baseband unit block 205 stores the baseband sample streams received from remote radio units through Ethernet port 210 in the memory block 405. The memory block 405 is large enough to accommodate very large delay jitters.

In one embodiment, the baseband unit block 205 formats the baseband sample streams received from remote radio units through Ethernet port 210 and stored in memory block 405 in format block 406 based on their time, stream number, remote radio identifier and other information.

In one embodiment, the baseband unit block 205 interpolates the baseband sample streams from format block 406 in interpolate block 207 to the rate used by baseband signal processing 401 based on the decimation rate which is performed in the remote radio units transmitting the baseband sample streams to the cloud.

In one embodiment, the baseband unit block 205 un-truncates the baseband sample streams from interpolate block 407 in un-truncate block 408 to the bit resolution used by baseband signal processing 401 based on the truncation which is performed in the remote radio units transmitting the baseband sample streams to the cloud.

In one embodiment of baseband unite block 205, the order of truncate block 402 and decimate block 403 can be inter-exchanged. In another embodiment the order of interpolate block 407 and un-truncate block 408 can be inter-exchanged.

Figure 5:
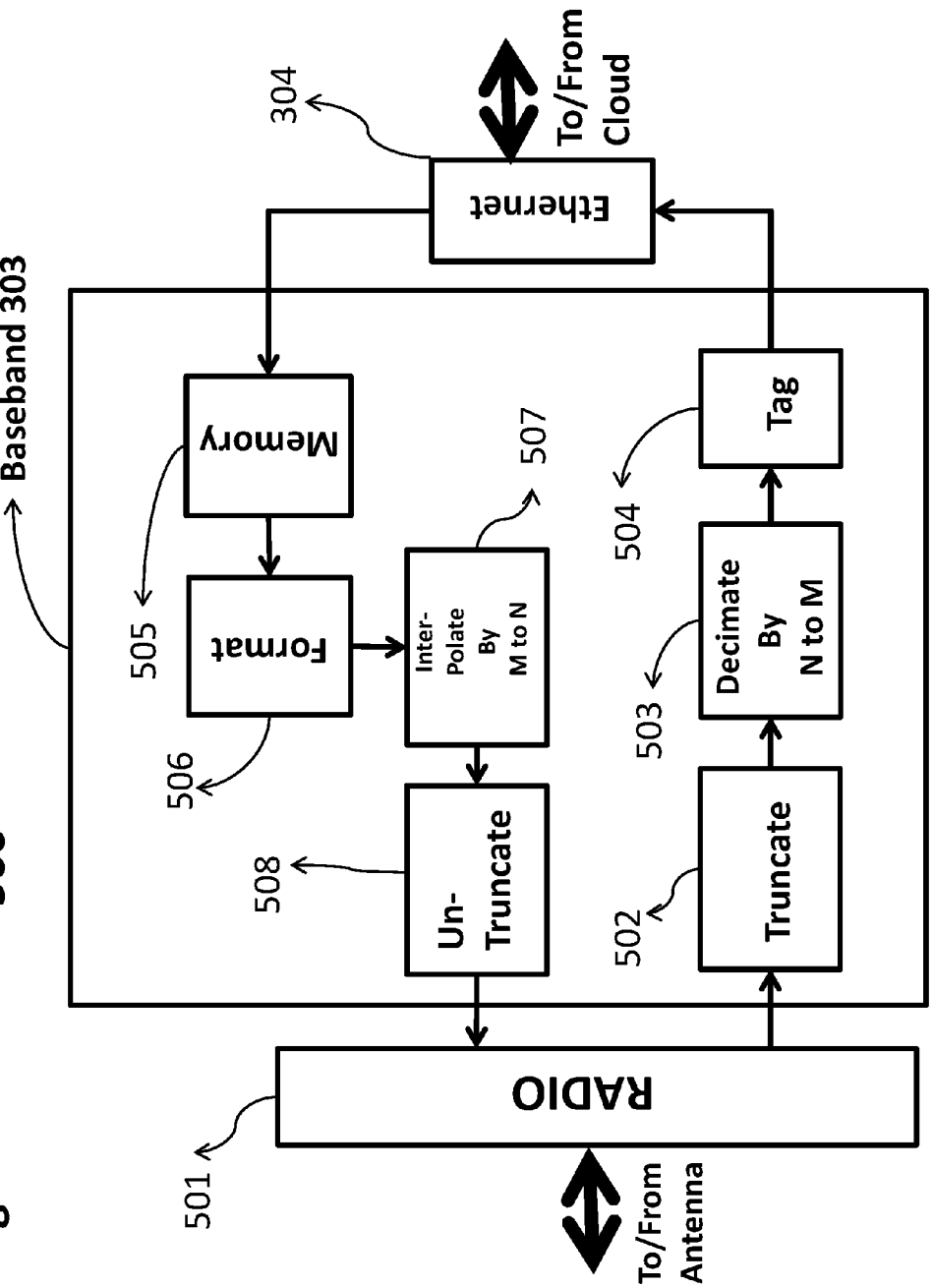
FIG. 5 shows an embodiment of baseband in a remote radio unit.

FIG. 5 depicts the embodiment of remote radio unite sample rate reduction 500. The sample rate reduction 500 shows the details of baseband 303 within remote radio unite 300. The baseband 303 includes, among other things, truncate block 502, decimate block 503, tag block 504, memory block 505, format block 506, interpolate block 507 and un-truncate block 508.

In one embodiment, the baseband block 303 truncates the baseband sample streams from radio block 501 destined for transmission to the cloud in truncate block 502. In wireless communication truncation to 10 bits per sample produce negligible performance degradation. Lower baseband sample's bit resolution can also be used.

In one embodiment, the baseband block 303 decimates the baseband sample streams from radio block 501 destined for transmission to the cloud in decimate block 403. In LTE wireless communication decimating the sample rate by M/N when M is 2 and N is 3 results in no performance degradation.

In one embodiment, the baseband block 303 tags the baseband sample streams from radio block 501 destined for transmission to the cloud in tag block 504 with time, stream number, remote radio identifier and other information or identifiers.

In one embodiment, the baseband block 303 stores the baseband sample streams received from the cloud through Ethernet port 304 in the memory block 505. The memory block 505 is large enough to accommodate very large delay jitters.

In one embodiment, the baseband block 303 formats the baseband sample streams received from the cloud through Ethernet port 304 and stored in memory block 505 in format block 506 based on their time, stream number, remote radio identifier and other information.

In one embodiment, the baseband block 303 interpolates the baseband sample streams from format block 506 by N/M in interpolate block 507 to a rate used by radio 501 based on the decimation rate which is performed in the cloud transmitting the baseband sample streams to the remote radio unit.

In one embodiment, the baseband block 303 un-truncates the baseband sample streams from interpolate block 507 in un-truncate block 508 to the bit resolution used by radio 501 based on the truncation which is performed in the cloud transmitting the baseband sample streams to the remote radio unit.

In one embodiment of baseband block 303, the order of truncate block 502 and decimate block 503 can be inter-exchanged. In another embodiment the order of interpolate block 507 and un-truncate block 508 can be inter-exchanged.

Various embodiments are thus described. While particular embodiments have been described, it should be appreciated that the embodiments should not be construed as limited by such description, but rather construed according to the following claims.

The invention claimed is:

1. A rate reduction technique to lower a baseband sample transmission rate between a remote radio unit (RRU) and a cloud in a Long Term Evolution (LTE) cloud radio access network (CRAN) comprising:
   a computing device with memory in the RRU to execute a RRU's baseband unit;
   a computing device with memory in the cloud to execute a cloud's baseband unit;
   a truncation block in the cloud's baseband unit to truncate the baseband samples to lower than 16 bits before transmission to the RRU;
   a truncation block in the RRU's baseband unit to truncate the baseband samples to lower than 16 bits before transmission to the cloud;
   a decimation block in the cloud's baseband unit to decimate the baseband sample rate before transmission to the RRU;
   a decimation block in the RRU's baseband unit to decimate the baseband sample rate before transmission to the cloud;
   an interpolation block in the cloud's baseband unit to interpolate the baseband samples received from the RRU;
   an interpolation block in the RRU's baseband unit to interpolate the baseband samples received from the cloud;
   an un-truncation block in the cloud's baseband unit to un-truncate the baseband samples received from the RRU;
   an un-truncation block in the RRU's baseband unit to un-truncate the baseband samples received from the cloud.

2. The rate reduction technique of claim 1, wherein a M/N decimation is used in LTE wireless mobile communication with no performance degradation when M is 2 and N is 3.

3. The rate reduction technique of claim 1, wherein the baseband samples is truncated to 10 bits with negligible performance degradation in wireless mobile communication systems.

4. The rate reduction technique of claim 1, wherein the order of the truncation block and the decimation block can be inter-exchanged.

5. The rate reduction technique of claim 1, wherein the order of the interpolation block and the un-truncation block can be inter-exchanged.

6. The rate reduction technique of claim 1, wherein said baseband sample is truncated to lower than 10 bits.

* * * * *